(12) United States Patent
Layne et al.

(10) Patent No.: US 6,543,609 B2
(45) Date of Patent: Apr. 8, 2003

(54) SPLIT SPROCKET HOUSING FOR A CONVEYOR SYSTEM AND RELATED METHOD

(75) Inventors: James L. Layne, Bowling Green, KY (US); Stephen C. Fye, Glasgow, KY (US); Michael D. McDaniel, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 67 days.

(21) Appl. No.: 09/784,544

(22) Filed: Feb. 15, 2001

(65) Prior Publication Data

US 2002/0108840 A1 Aug. 15, 2002

(51) Int. Cl.[7] .................. B65G 21/10; B65G 21/20
(52) U.S. Cl. .................. 198/837; 198/834; 198/835; 198/861.1
(58) Field of Search .................. 198/834, 835, 198/837, 840, 861.1

(56) References Cited

U.S. PATENT DOCUMENTS

| | | | |
|---|---|---|---|
| 1,686,672 A | 10/1928 | Thompson | |
| 1,965,285 A | 7/1934 | Gilstad | |
| 2,126,274 A | 8/1938 | Noffsinger et al. | |
| 2,297,813 A | 10/1942 | Stork | |
| 2,308,872 A | 1/1943 | Foster | |
| 2,361,131 A | 10/1944 | Smith | |
| 3,213,703 A | 10/1965 | Fitzgerald | |
| 3,513,965 A | 5/1970 | Miller | |
| 3,529,715 A | 9/1970 | Mueller | |
| 3,605,994 A | 9/1971 | Parlette | |
| 3,641,831 A | 2/1972 | Palmaer | |
| 3,685,367 A | 8/1972 | Dawson | |
| 3,788,447 A | 1/1974 | Stephanoff | |
| 3,881,593 A | 5/1975 | Mushovic et al. | |
| 3,952,860 A | 4/1976 | Specht | |
| 4,222,478 A | 9/1980 | Gasser | |
| 4,222,483 A | 9/1980 | Wootton et al. | |
| 4,436,200 A | 3/1984 | Hodlewsky et al. | |
| 4,555,014 A | 11/1985 | Krempa | |
| 4,631,974 A | * 12/1986 | Wiegand et al. | 74/450 |
| 4,886,158 A | 12/1989 | Lapeyre | |
| 4,953,693 A | 9/1990 | Draebel | |
| 5,027,940 A | 7/1991 | Woodward | |
| 5,031,757 A | 7/1991 | Draebel et al. | |
| 5,035,681 A | * 7/1991 | Hertel et al. | 474/152 |
| 5,037,356 A | 8/1991 | Gladczak et al. | |
| 5,105,936 A | 4/1992 | Stapper et al. | |
| 5,127,515 A | 7/1992 | Damkjaer | |
| 5,143,204 A | 9/1992 | Owen et al. | |
| 5,178,263 A | 1/1993 | Kempen | |
| 5,186,312 A | * 2/1993 | Ambs et al. | 198/716 |
| 5,232,068 A | 8/1993 | Bandy, Jr. | |
| 5,279,526 A | 1/1994 | Gundlach | |
| 5,311,983 A | 5/1994 | Clopton | |
| 5,314,059 A | * 5/1994 | Clopton | 198/860.1 |
| 5,375,697 A | 12/1994 | Battati et al. | |
| 5,389,044 A | * 2/1995 | Bandy, Jr. et al. | 474/96 |
| 5,469,958 A | 11/1995 | Gruettner et al. | |
| 5,562,202 A | 10/1996 | Newcomb et al. | |
| 5,609,008 A | * 3/1997 | Reuteler | 53/398 |
| 5,620,084 A | 4/1997 | Mensch | |
| 5,702,316 A | 12/1997 | Cole | |
| 5,704,465 A | * 1/1998 | Ambs | 198/716 |
| 6,202,834 B1 | 3/2001 | Layne et al. | |

* cited by examiner

Primary Examiner—Douglas Hess
(74) Attorney, Agent, or Firm—King & Schickli, PLLC

(57) ABSTRACT

A split housing for a sprocket in a conveyor system is disclosed. The sprocket includes a first, preferably upper portion that mates with a second, preferably lower portion to define a curved guide track for guiding a conveyor belt from a forward to a return run, or vice versa. The split nature of the housing allows for the removal of one portion, such as the upper portion, in a vertical direction without the need for moving the adjacent sprocket or guide rail. Hence, the other portion may remain attached to a stable structure used to support the conveyor system.

28 Claims, 3 Drawing Sheets

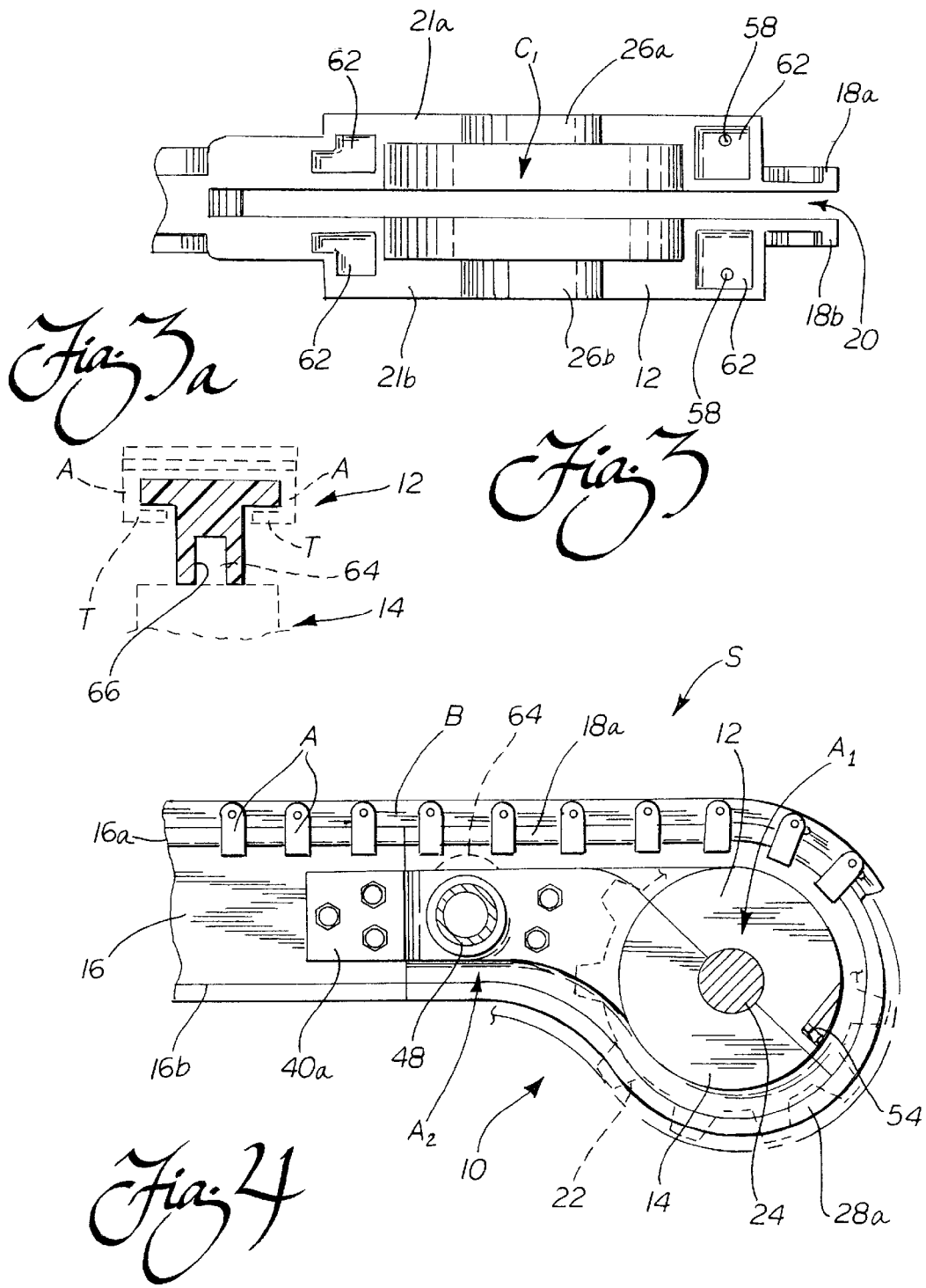

SPLIT SPROCKET HOUSING FOR A CONVEYOR SYSTEM AND RELATED METHOD

TECHNICAL FIELD

The present invention relates to the conveyor art and, more particularly, to an improved split housing for at least partially covering a drive or idler sprocket in a conveyor system.

BACKGROUND OF THE INVENTION

Today, in many modern manufacturing facilities, modular conveyor systems are extensively utilized to transport articles to and from various work stations during all stages of production. In recent years, manufacturers using production lines with conveyors as an integral component of the material handling system have realized reasonably significant gains in productivity and resource utilization. As a result, modular conveyor systems have become even more widely implemented and have been adapted to meet an even wider scope of the material handling needs of producers of a multitude of consumer and industrial goods. Therefore, the continual development of improved modular conveyors is necessary in order to keep pace with the demands and expectations of the users of such conveyors.

Conventional conveyor systems employing endless, modular link or roller chain belts are typically driven at one end of an elongated guide structure, such as a rail or the like, by a sprocket coupled to a rotating shaft. The shaft is in turn rotated by a motive device, such as a variable speed electric motor. At the opposite end of the guide structure, an idler sprocket for engaging the belt is coupled to an idler shaft. As should be appreciated, the drive and idler sprockets assist in supporting and guiding the endless belt as it makes the transition from the forward run to the return run, or vice versa, at each respective end of the guide structure.

Of course, both the drive and idler sprockets are subject to wear as a result of the substantially continuous engagement maintained with the conveyor belt. If not kept in check, this wear may affect the overall performance of the conveyor system. For example, a worn sprocket may allow the belt to slip, which creates both timing and efficiency problems. Hence, it is necessary to perform an inspection of the sprocket(s) from time to time to determine whether some form of ameliorative action, such as a repair operation or perhaps even a complete replacement, is required.

While inspection may only require removing the belt to gain visual access to the sprocket, a repair operation or a complete replacement requires removing the sprocket from the corresponding support shaft altogether. In the case where a single unhoused drive or idler sprocket is carried on the shaft, removing the belt and the sprocket is a relatively uncomplicated undertaking. However, in the situation where a plurality of sprockets are gang driven or carried on a single support shaft, removing any of the inner sprockets becomes a time and labor intensive process, since all adjacent outer sprockets and any other corresponding structures (side plates, chain guides/strippers, conveyor frame components or other support structures, etc.) must first be removed. As should be appreciated, removing even a portion of the sprockets significantly increases the time and labor involved. Additionally, the wholesale removal and replacement of multiple sprockets carried on a shaft may create alignment and/or timing problems that must be corrected to ensure efficient operation. Of course, the time and labor required to remedy these problems further exacerbates the situation.

In some conveyor systems, it is also desirable to employ a sprocket housing. An example of a housing arrangement for a sprocket used in a roller chain conveyor system may be found in U.S. Pat. Nos. 5,314,059 and 5,311,983, both the Clopton. As should be appreciated, the use of such a sprocket housing is generally advantageous, since it not only covers and protects the sprocket from external interference, but also provides a guiding function for the belt as it transitions along and is engaged by the sprocket.

Despite generally providing the limited advantages described above, it can easily be appreciated that the use of a housing, such as the one disclosed in the above-referenced patents, serve as yet another obstacle to easily accessing or removing the sprocket. Specifically, since the housing is divided into left and right halves through which the shaft for supporting the sprockets extends, extra effort is required to completely remove the sprocket from the shaft. The amount of effort required is greater in the case where a plurality of sprockets are coaxially mounted, since any adjacent sprockets and/or housings must first be removed. Also, since each portion of the split housing is connected directly to the adjacent guide rail, it is also necessary to remove any fasteners or connectors used to secure the adjacent housings to the guide rails prior to removing the sprocket. This significantly increases the time and expense required for performing even a cursory inspection of a single sprocket to determine whether replacement is warranted.

Another consideration in extending the service life of most driven conveyor belt systems is reducing friction. In the past, many proposals have focused on providing sprocket housings that support the shafts on active bearing elements or, more recently, bearing surfaces formed of materials having enhanced resistance to wear and beneficial tribological characteristics (e.g., ultrahigh molecular weight (UHMW) plastics). Even with the use of such specialized materials, supplying additional lubrication is often desirable to ensure that the drive and/or idler shafts freely rotate relative to the housings and create only a modicum of wear. However, in many conveyor systems, and especially those employed for conveying food products or the like, the operator must be careful in applying the lubricant to avoid potentially creating a contamination hazard. Hence, eliminating the need for external lubrication in conveyor systems where a modular link or roller chain conveyor belt is guided by or through a sprocket housing in making the transition from the forward to the return run in the conveyor system, or vice versa, is desirable.

Accordingly, the foregoing discussion clearly identifies the particular need for an improved manner of housing one of the drive or idler sprockets in a conveyor system. By splitting the housing into first and second portions in a novel manner, it would be possible to mount the first portion independently of any guide rail or structure supporting the second portion. Hence, the second portion could remain attached to a stable structure at all times while the first portion is fully or partially removed. This would permit one performing an inspection to gain full access to the sprocket and adjacent shaft without requiring the removal of the portion attached to the stable support structure, any adjacent sprockets, or other structures. The optional use of a split sprocket would also further enhance the efficiency of the repair or replacement operation, and again without any significant disruption to the overall conveyor system. Likewise, the optional use of an internal lubricant source in the housing would ensure that the desired low friction rotation of the support shaft is achieved without the need for externally applying a lubricant and, in the case where food products are being conveyed, risking contamination. Overall, this combination of features would result in an conveyor system that is a significant improvement over those proposed in the past, especially in terms of maintenance cost and efficiency.

SUMMARY OF THE INVENTION

In accordance with a first aspect of the present invention, an apparatus for at least partially covering a sprocket and assisting in guiding a conveyor belt in making a transition from a guide rail over the sprocket (or vice versa) is disclosed. The apparatus comprises a housing split into mating first and second portions. The housing at least partially covers the sprocket and includes a first guide track for guiding the belt along the transition and over the sprocket. As a result of the split in the housing, at least one of the first or second portions may be removed in a vertical direction without moving the sprocket in the housing or the guide rail.

In one embodiment, the first portion of the housing is an upper portion and the second portion of the housing is a lower portion. These upper and lower portions together define a first aperture for receiving a shaft for supporting the sprocket. The lower portion of the housing may include at least one reservoir adjacent to the first aperture for holding a lubricant for lubricating the shaft. A wick in the reservoir may provide the desirable wicking action to ensure that the lubricant is delivered from the reservoir to adjacent the shaft. The lower portion of the housing may also include a receiver for receiving a stable support structure, such that the upper portion of the housing may be removed while the lower portion remains fully supported by the stable support structure.

A portion of the first guide track in the housing may include an opening for allowing one or more teeth on the sprocket to engage the passing belt. Preferably, the first portion of the housing includes the first guide track and the second portion of the housing includes a second guide track for aligning with the first guide track to define a substantially continuous guide surface. At least a portion of the second guide track may include a second opening for allowing one or more teeth of the sprocket to engage the passing belt.

One of the first or second portions of the housing may include at least one boss that engages a corresponding emboss on the opposite portion. The mating boss and emboss assist in achieving proper alignment of the first and second portions. The first and second portions may also be secured by at least one fastener. The fastener preferably extends through an aperture in the first portion into a bore in the second portion.

In one embodiment, the modular link conveyor belt includes a plurality of interconnected links, with each link having a pair of depending arms. Each depending arm carries an inwardly projecting guide tab. The first guide track includes first and second lips for engaging the respective guide tabs as the conveyor belt passes. Preferably, the lips project outwardly in an opposed fashion.

In accordance with a second aspect of the invention, a conveyor system comprising at least one endless conveyor belt having a forward run for moving articles from one location to another and a return run is disclosed. The system further comprises at least one driver including a first sprocket for driving the belt, at least one guide rail for guiding the forward and return runs of the belt, a second sprocket for assisting the belt in making a transition from one of the forward run or the return run of the at least one guide rail, and at least one housing for at least partially covering one of the first or second sprockets. The housing is split into mating first and second portions and includes a first guide track for guiding the conveyor belt over the corresponding first or second sprocket. At least one of the portions of the housing may be removed in a vertical direction without moving the sprocket corresponding to the housing or the guide rail.

In one embodiment, the first portion of the housing is an upper portion and the second portion of the housing is a lower portion. The lower portion may include a receiver for receiving a stable support structure. Accordingly, the upper portion of the housing may be removed while the lower portion remains supported by the stable support structure.

Preferably, the guide rail is in the shape of an I-beam and includes upper and lower guide tracks for guiding the belt along the respective forward and return runs. The upper guide track of the guide rail may be aligned with the first guide track of the housing to create a continuous guide surface for the belt as it transitions from the forward run to the return run, or vice versa. The second portion of the housing may also include a second guide track for assisting the belt in making the transition to the corresponding forward or return run. Hence, the upper guide track of the guide rail may be aligned with the first guide track of the housing and the lower guide track of the guide rail may be aligned with the second guide track of the second portion of the housing to create a continuous guide surface for the belt.

A shaft for supporting the first or second sprocket in the housing is also provided. Preferably, the first or second sprocket is a split sprocket comprised of at least two mating portions that couple over the support shaft. Hence, upon separating the first and second portions of the housing, full access is provided to one of the mating portions of the split sprocket for inspection or removal.

The first and second portions of the housing in the mated position may together define a first aperture for receiving a shaft for supporting the first or second sprocket. The first portion of the housing is preferably a lower portion and includes at least one reservoir adjacent to the first aperture for holding a lubricant for lubricating the shaft. A wick for placement in the reservoir serves to wick the lubricant to a position adjacent the shaft.

In one embodiment, the modular link conveyor belt includes a plurality of interconnected links. Each link includes a pair of depending arms, with each arm carrying an inwardly projecting guide tab. The first guide track includes first and second lips for engaging the guide tabs of the conveyor belt. Preferably, the lips project outwardly in an opposed fashion.

In accordance with a third aspect of the invention, a method for accessing a sprocket carried on a support shaft for assisting a conveyor belt in making the transition from a forward to a return run along a guide rail in a conveyor system is disclosed. The method comprises: (1) placing the sprocket in a split housing having mating first and second portions; (2) removing one portion of the split housing in a vertical direction without moving the sprocket or the guide rail. The first portion may be an upper portion and the second portion may be a lower portion, and the removing step may include removing the upper portion. Also, the sprocket may be a split sprocket comprised of at least two portions, and the method may include removing at least one portion of the split sprocket after removing the first portion of the split housing.

BRIEF DESCRIPTION OF THE DRAWINGS

The accompanying drawings incorporated in and forming a part of the specification illustrate several aspects of the present invention and, together with the description, serve to explain the principles of the invention.

In the drawings:

FIG. 1a is an elevational view of one end of a lower portion of the split housing;

FIG. 3 is a partially cutaway bottom view of the top portion of the split housing;

FIG. 3a is a cross-sectional view of the guide track portion of the upper housing taken along line 3a—3a of FIG. 1; and FIG. 4 is a partially cutaway, side elevational view of the split housing attached to one end of a guide rail in a conveyor system including a modular link conveyor belt.

DETAILED DESCRIPTION OF THE PREFERRED EMBODIMENT

Figure 1:
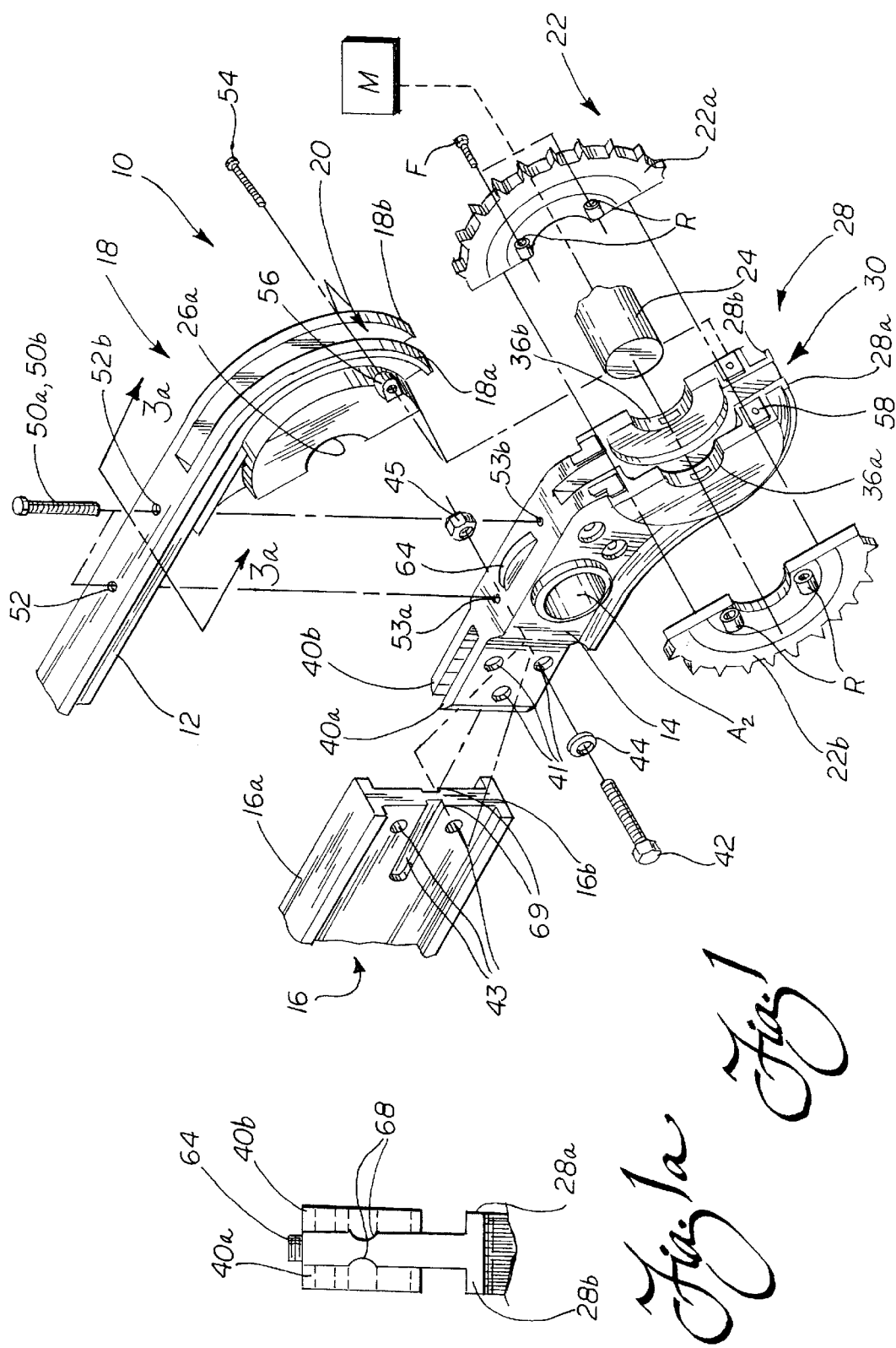
FIG. 1 is an exploded perspective view of a split housing for a sprocket in a conveyor system.

With reference to the exploded perspective view of FIG. 1, a sprocket housing 10 for use in forming a part of a conveyor system S, including a modular link conveyor belt B (see in particular FIG. 4), is disclosed. As described further below, the housing 10 is divided into upper and lower mating portions 12, 14. Together, these mating portions 12, 14 serve to not only protect a drive or idler sprocket, but also assist in guiding the belt B as it makes the transition from a forward to a return run.

Preferably, the belt B has a "narrow width," and is of the type described in commonly assigned U.S. patent application Ser. No. 09/033,572, entitled "Modular Link Conveyor With I-Beam Guide Rail," now U.S. Pat. No. 6,202,834, as well as in issued U.S. Pat. Nos. 5,031,757 and 4,953,693, all three of which are fully incorporated herein by reference. In the illustrated embodiment of the conveyor system S, and as more specifically disclosed in the first of the above-referenced patents, the belt B is guided along the return and forward runs by upper and lower guide tracks 16a, 16b of an I-beam guide rail 16. The guide rail 16 may be formed from a single piece of material extruded into an I-beam or two pieces of C-shaped material placed back-to-back, which in -either case forms integral or unitary guide tracks 16a, 16b. Alternatively, the guide rail 16 may comprise a plurality of clamping assemblies (not shown) that hold separate upper and lower integral or unitary guide tracks (not shown) in the desired spaced relationship.

As mentioned above, the sprocket housing 10 is split into upper and lower portions 12, 14 that mate together. The upper portion 12 may include a first guide track 18, at least a portion of which is partially curved to guide the belt B from the forward to the return run, or vice versa. In the illustrated embodiment, this guide track 18 includes first and second flanges or lips 18a, 18b for engaging and guiding the belt B as it transitions from the upper guide track 16a to the guide track 8 of the housing 10. These guide flanges or lips 18a, 18b are integral or unitary along a first portion, but eventually are spaced apart along at least part of the curved portion to create an opening 20, the function of which is outlined further in the description that follows. Preferably, these lips 18a, 18b are outwardly directed in an opposed fashion (see FIG. 3) such that each creates a bearing surface for an opposing guide tab T projecting or extending inwardly from a depending arm A on each side of the singular link (or from one side of separate links) defining the respective side edges of the conveyor belt B (see the phantom view of a link in cross section in FIG. 3a). The upper portion 12 of the housing 10 also includes a pair of sidewalls 21a, 21b, each of which may optionally define an oversized, semi-circular chamber $C_1$ for receiving an outwardly directed portion of a toothed sprocket 22.

The sprocket 22 is supported on and carried by a transversely extending shaft 24. As should be appreciated, the sprocket 22 may be an idler sprocket or a driven sprocket. In the latter case, the shaft 24 is coupled to a motive device, such as a variable speed electric motor M or the like. As described further below, the sprocket 22 used in either situation may also be a "split" sprocket divided into two or more portions 22a, 22b. The two portions 22a, 22b are then coupled together over the shaft 24 and secured together, such as by fasteners F that correspond to receivers R formed in each portion of the sprocket 22.

As best shown in FIG. 1, the upper portion 12 of the housing 14 also includes cutout portions 26a, 26b in each sidewall 19a, 19b. As will be better understood after reviewing the description that follows, these cutout portions 26a, 26b are preferably semi-circular and, hence, partially define a first aperture $A_1$ in each sidewall 19a, 19b for receiving and allowing the shaft 24 carrying the sprocket 22 to pass through the housing 10. In the preferred embodiment, the cutouts 26a, 26b each define a portion of the bearing surfaces for the shaft 24. Alternatively, a bearing insert (not shown), such as an active roller or ball bearing, or a passive bushing, could be mounted in the apertures $A_1$.

The lower portion 14 of the housing 10 includes a second partially curved guide track 28 having first and second guide lips 28a, 28b. These lips 28a, 28b may also be spaced along a curved portion to create an opening 30 along a portion of the guide track 28, and are preferably shaped like the lips 18a, 18b of the first guide track 18. Spaced sidewalls 29a, 29b in this lower portion 14 may also define an optional chamber $C_2$ that corresponds to chamber $C_1$ and is sized for receiving any outwardly directed structures on the sprocket 22 (such as the receivers R for the fasteners F that may be used to couple the split sprocket portions 22a, 22b together). The sidewalls 29a, 29b may also include cutouts 36a, 36b that correspond to cutouts 26a, 26b and further partially define the first apertures $A_1$ in the housing 10 for receiving the shaft 24.

To mount the housing 10 to a support structure, and in particular, an I-beam guide rail 16 of the type shown in FIG. 1, a pair of spaced, outwardly projecting mounting plates 40a, 40b may be provided at one end of the housing 10, and preferably on the lower portion 14. Each mounting plate 40a, 40b may include at least one, and preferably a plurality of holes 41 for allowing a transversely extending fastener, such as a partially threaded bolt 42 or dowel, to pass. The upstanding portion of the guide rail 16 preferably includes similar holes 43 for receiving the passing bolt 42 or other fastener. One or more washers 44 may be used as necessary to ensure that any corresponding nut 45 for holding the bolt 42 in place is properly seated to resist rotation and inadvertent loosening. An optional second aperture $A_2$ for receiving a stable structure, such as a transversely extending shaft 48 (see FIG. 4) forming a part of a conveyor frame (not shown), is also provided in this lower portion 14. This shaft 48 may provide added support and ensure alignment among several adjacent housings in the case where a plurality of sprockets are coaxially mounted on a single shaft (not shown).

The use of the split housing 10 in conjunction with the conveyor system S of FIG. 1 will now be described in detail. When the first and second portions 12, 14 are brought into the mated position, the first and second guide tracks 18, 28 align to create a continuously curving surface for engaging and guiding the belt B (see FIG. 4). As should be appreciated, the guide tracks 18, 28 are capable of fully guiding the belt B as it makes the transition from the forward to the return run (or vice versa). In addition, and as noted above, the cutouts 26a, 26b; 36a, 36b together define the apertures $A_1$ through the housing 10 that receive and create a bearing surface for rotatably supporting the shaft 24. The openings 20, 30 defined in the upper and lower portions 12, 14 of the housing 10 allow the teeth of the sprocket 22 to pass through the spaced guide tracks 18, 28 and into engagement with the belt B for either providing a guiding or driving function, as the case may be. If the sprocket 22 is split and includes receivers R/fasteners F, as shown in FIG. 1, the annular cavity defined by chambers $C_1$, $C_2$ permits unfettered rotation and at the same time offers the desired protection from external interference.

To secure the upper and lower portions 12, 14 of the housing 10 together, at least one, and preferably a plurality of fasteners are used. As illustrated in FIG. 1, a pair of threaded bolts or screws 50a, 50b may extend through holes 52a, 52b formed in the integral portion of the guide track 18 upstream of the opening 20 and into a corresponding bore 53a, 53b formed in the lower portion 14 of the housing 10. At least one bolt or screw 54 may also be inserted in a hole 56 formed in the upper portion 12 of the housing 10 adjacent to the chamber $C_1$ for mating with a corresponding bore 58 formed in the upper surface of the adjacent sidewall 29a or 29b of the lower portion 14 of the housing 10. As should be appreciated, a similar type of fastener (not shown) may also be used for securing together the opposite sides of the housing 10.

Figure 2:
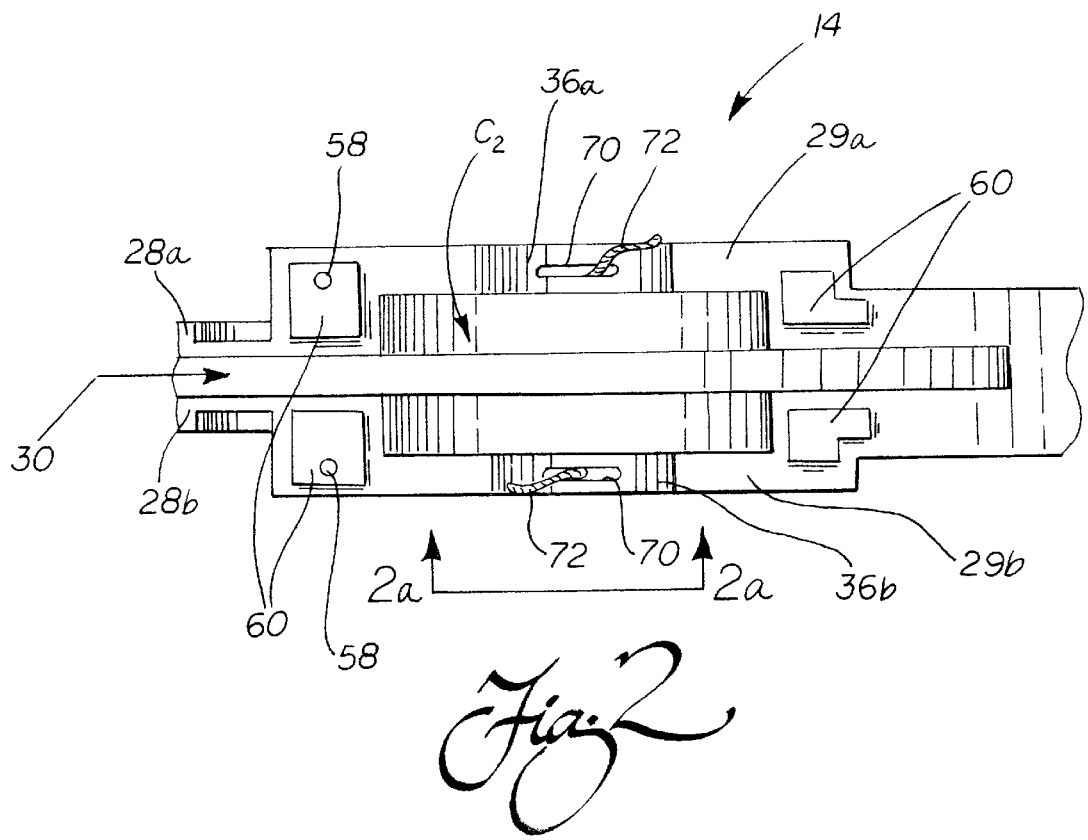
FIG. 2 is a partially cutaway top view of a lower portion of the split housing of FIG. 1.
Figure 2A:
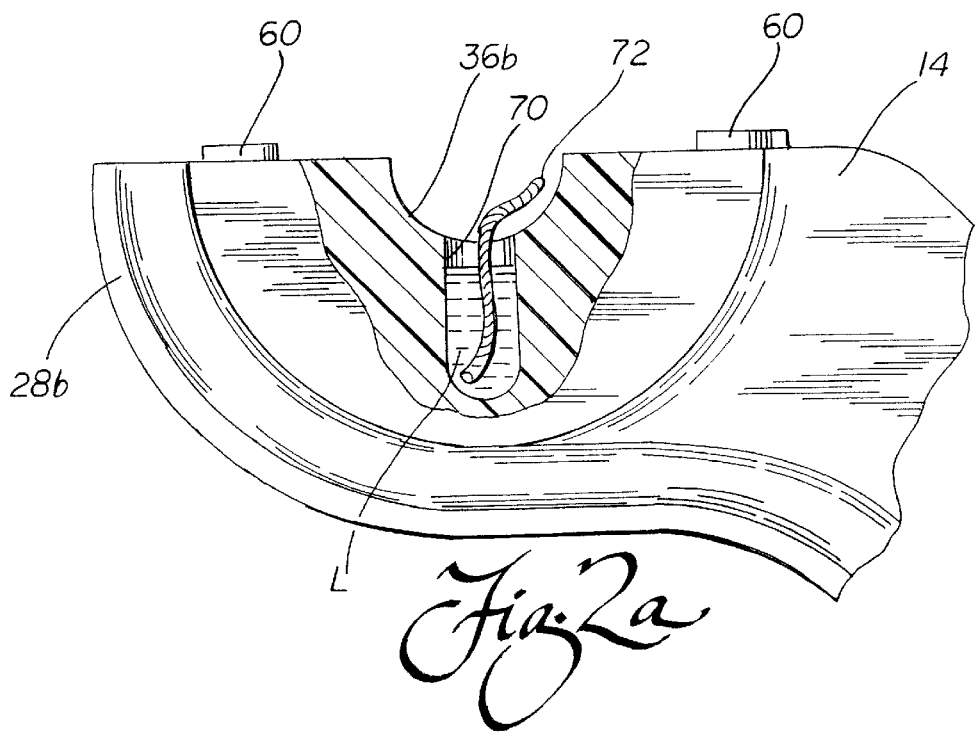
FIG. 2a is an enlarged partially cutaway, partially cross-sectional side view of the lower portion of the split housing, including one of the internal lubricant reservoirs.

In addition to ensuring that the portions 12, 14 remain fastened together, it is also desirable to ensure that the proper alignment between these portions of the housing 10 is achieved. To do so, one or more sets of aligning structures may be provided. Specifically, as best illustrated viewing FIGS. 1–3 simultaneously, one of the upper or lower portions 12, 14 of the housing 10 is provided with one or more bosses 60, and the opposite portion is provided with corresponding depressions, receivers, or embosses 62 for receiving the bosses 60. Together, these bosses/embosses 60, 62 ensure that proper alignment is achieved between the upper and lower portions 12, 14 when brought in the mated position. Preferably, the bosses and embosses 60, 62 are integrally formed in the sidewalls 21a, 21b; 29a, 29b of the corresponding portions of the housing 10.

The lower portion 12 of the housing 10 may also include one or more upwardly extending projections, such as the upstanding semi-circular flange 64 perhaps best shown in FIG. 1, that mates with a corresponding slot or channel 66 formed in the upper portion 14 of the housing 10 (see FIG. 3a) to further assist in ensuring that proper alignment is achieved. Also, a pair of inwardly directed, opposed projections 68 may be provided in the internal surfaces mounting plates 40a, 40b for mating with corresponding grooves 69 formed in the opposite sides of the upstanding portion of the I-beam guide rail 16. These projections 68 assist in ensuring that the proper vertical alignment is achieved. It should be appreciated that while it is desirable to use all of these structures in practicing a preferred embodiment, it is possible to use only some, or possibly none, of them while still achieving the several advantages afforded by the split sprocket housing 10 of the present invention.

As should now be appreciated, when the split housing 10 described above is used in a conveyor system S, the periodic inspection of the sprocket 22 held therein is facilitated. If resent, the adjacent belt B may be removed from the upper portion of the housing 10, such as by removing any connector necessary to separate two adjacent links or rollers and then compressing or removing the two portions of the belt thus created. Any fasteners, such as bolts, screws 50a, 50b, 54, clamps or the like, are then manually removed from the housing 10. As should be appreciated, once these fasteners are removed, the upper portion 12 is then easily removed in a vertical direction, while the lower portion 14 may remain fixed in place for supporting the sprocket 22 and corresponding shaft 24 from the guide rail 16 (and any support structure 48 present). As should be appreciated, there is no need to move the guide rail 16 or the sprocket 22 in performing this operation. Thus, in the case where a plurality of drive or idler sprockets are coaxially mounted on the shaft 24 (not shown), the ability to expose a single sprocket for inspection by removing one portion 12, 14 of the housing 10 without necessitating the removal of any adjacent sprockets, housing portions, etc., or even moving the sprocket itself, the corresponding guide rail, the shaft or other related structures, is advantageous, since it saves a significant amount of time and effort.

As noted above, it is also possible to employ a split sprocket 22 comprised of two or more mating portions to further facilitate the overall ease of replacement in the event of extreme or otherwise unacceptable wear. In the illustrated embodiment, these portions are shown as the first and second toothed sprocket halves 22a, 22b. The halves 22a, 22b are coupled together by fasteners F inserted in corresponding receivers R. The two halves include cutouts (not numbered) that receive the shaft 24 in a mated position. An optional transverse pin (not shown) may also be provided in the shaft 24 and extend into the sprocket 22 to assist in preventing it from slipping during rotation. A detailed description of a similar example of a split sprocket arrangement can be found in the above-referenced commonly assigned patent application.

In accordance with another aspect of the invention, an internal source of lubricant L for the shaft 24 may also be provided in the housing 10. The lubricant source may be in the form of at least one, and preferably a pair of reservoirs 70 formed in the lower portion 14 of the housing 10 adjacent to the bearing surface for the shaft 24. An optional wick 72 formed of an absorbent material (cotton or the like) is preferably provided in each reservoir 70 to a position adjacent the bearing surface for the shaft 24. Hence, the lubricant L is moved via wicking action to adjacent the shaft 24, which ensures that a constant, controlled supply results. By selecting the particular material forming the wick 72 and its size, the amount of lubricant L delivered may be adjusted. The lubricant reservoirs 70 may simply be filled during servicing, but it is also possible to use an automated device to keep the lubricant L at a predetermined level. The lubricant L is preferably a light-duty oil. In cases where food products or the like are conveyed, the lubricant L may be food grade to lessen the chance for contamination.

Most of the components of the conveyor system S forming the present invention, including the split housing 10, the guide rail 16, the sprocket 22, and the conveyor belt B are;formed of lightweight, but durable plastic materials. The materials may include polypropylene, polyethylene, nylon, acetal or the like. The shaft 24, support 48, and various fasteners are preferably formed of a durable, corrosion resistant material, such as stainless steel, to ensure a long service life. Of course, the use of materials other than those described is possible, depending on the particular environment in which the split housing 10 or overall conveyor system S is used.

Obvious modifications to the housing 10 are also possible. For example, one or both of the sidewalls 21a, 21b; 29a, 29b may be eliminated or otherwise provided with perforations to allow a cleaning fluid to more easily reach the corresponding sprocket 22. Also, a different type of mounting arrangement may be substituted for the mounting plates 40a, 40b, especially in the case where the guide rail 16 is not in the form of an I-beam, but instead includes a pair of spaced guide rails to define non-integral guide tracks (see the '693 patent). The width and dimensions of the guide tracks 18, 28 may also be adjusted as necessary to accommodate a particular width of belt B, or for guiding a belt having structures other than depending arms carrying inwardly projecting or extending guide tabs T. The housing 10 may also be used in a conveyor system S where both ends of the endless belt B are supported by idler sprockets and the driving force is supplied by an intermediate driver positioned along the forward or return run.

The foregoing description of the various embodiments of the invention is presented for purposes of illustration and description. It is not intended to be exhaustive or to limit the invention to the precise form disclosed. Obvious modifications or variations are possible in light of the above teachings. The embodiments chosen were described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for at least partially covering a sprocket and assisting in guiding a conveyor belt making a transition from a guide rail over the sprocket or vice versa, comprising:
   a housing split into mating first and second portions, said housing at least partially covering the sprocket and including a first guide track for guiding the belt along the transition;
   wherein at least one of said first or second portions may be moved in a vertical direction without moving the sprocket in the housing or the guide rail.

2. The guide apparatus according to claim 1, wherein the first portion of the housing is an upper portion and the second portion of the housing is a lower portion.

3. The guide apparatus according to claim 2, wherein the housing includes a pair of generally aligned openings for receiving a shaft for supporting the sprocket.

4. The guide apparatus according to claim 3, wherein the lower portion of the housing includes at least one reservoir for holding a lubricant for lubricating the shaft.

5. The guide apparatus according to claim 4, further including a wick for placement in the reservoir to wick the lubricant from the reservoir to adjacent the shaft.

6. The guide apparatus according to claim 2, wherein the lower portion of the housing includes a receiver for receiving a stable support structure, whereby the upper portion of the housing may be removed while the lower portion remains fully supported by the stable support structure.

7. The guide apparatus according to claim 1, wherein a portion of said first guide track includes an opening through which at least a portion of the sprocket passes to engage the belt.

8. The guide apparatus according to claim 1, wherein the first portion of the housing includes said first guide track and the second portion of the housing includes a second guide track for aligning with said first guide track to define a substantially continuous guide surface.

9. The guide apparatus according to claim 8, wherein at least a portion of said second guide track includes a second opening through which at least a portion of the sprocket passes to engage the belt.

10. The guide apparatus according to claim 1, wherein the one of the first or second portions of the housing includes at least one boss that engages a corresponding emboss on the opposite portion, wherein the boss and emboss assist in achieving proper alignment of said first and second portions.

11. The guide apparatus according to claim 1, wherein the first and second portions are held together by at least one fastener extending through an aperture in said first portion into a bore in said second portion.

12. The guide apparatus according to claim 1, wherein the first guide track includes first and second lips for engaging the conveyor belt.

13. The guide apparatus according to claim 12, wherein the lips of the guide track project outwardly in an opposed fashion.

14. A conveyor system, comprising:
   at least one endless conveyor belt;
   at least one driver including a split sprocket for driving the belt;
   a first shaft for supporting the sprocket;
   at least one guide rail for guiding a forward and a return run of the belt;
   at least one housing for at least partially covering said sprocket, said housing being split into separable first and second portions and including a pair of openings for receiving the support shaft;
      Wherein at least one of the portions of said housing may be moved in a vertical direction with out the sprocket, the shaft, or the guide rail.

15. The conveyor system according to claim 14, wherein the first portion of the housing is an upper portion and the second portion of the housing is a lower portion.

16. The conveyor system according to claim 15, wherein the lower portion includes a receiver for receiving a stable support structure, whereby the upper portion of the housing may be removed while the lower portion remains supported by the stable support structure.

17. The conveyor system according to claim 14, wherein the guide rail is in the shape of an I-beam and includes upper and lower guide tracks for guiding the belt along the respective forward and return runs.

18. The conveyor system according to claim 17, wherein the upper guide track of the guide rail is aligned with a first guide track of the housing.

19. The conveyor system according to claim 18, wherein the second portion of the housing includes a second guide track, wherein the upper guide track of the guide rail is aligned with the first guide track of the housing and the lower guide track of the guide rail is aligned with the second guide track of the second portion of the housing.

20. The conveyor system according to claim 14, wherein the modular link conveyor belt includes a plurality of interconnected links, each said link having a pair of depending arms, each said arm carrying an inwardly projecting guide tab, wherein a first guide track associated with the housing includes first and second lips for engaging the guide tabs of the conveyor belt.

21. The conveyor system according to claim 14, wherein the first and second portions of the housing in the mated position together define the openings for receiving the shaft for supporting the sprocket.

22. The conveyor system according to claim 14, wherein the first portion of the housing is a lower portion and includes at least one reservoir for holding a lubricant for lubricating the shaft.

23. The conveyor system according to claim 22, further including a wick for placement in the reservoir to wick the lubricant to a location adjacent the shaft.

24. A method for accessing a sprocket for assisting a conveyor belt in making the transition from a forward to a return run along a guide rail in a conveyor system, comprising:

placing the sprocket in a split housing having mating first and second portions, the housing including a guide track having an opening through which the sprocket passes for engaging the belt;

removing one portion of the split housing in a vertical direction to provide access to the sprocket without moving the sprocket or the guide rail.

25. The method according to claim 24, wherein the first portion is an upper portion and the second portion is a lower portion, and the step of removing includes removing the upper portion.

26. The method according to claim 24, wherein the sprocket is a split sprocket comprised of at least two portions, and the method includes removing at least one portion of the split sprocket after removing the first portion of the split housing.

27. An apparatus for at least partially covering a sprocket and assisting in guiding a conveyor belt making a transition from a guide rail over the sprocket or vice versa, comprising:

a housing split into mating first and second portions, said housing at least partially covering the sprocket and including a first guide track having opposed lips for guiding the belt along the transition;

wherein at least one of said first or second portions may be moved in a vertical direction without moving the sprocket in the housing or the guide rail.

28. A conveyor system, comprising:

an endless conveyor belt;

a shaft;

a sprocket divided into two mating portions supported by the shaft;

a guide rail for guiding the belt; and a housing for said split sprocket, said housing being split into separable first and second portions and including a first guide track for guiding the conveyor belt over the split sprocket.

* * * * *

UNITED STATES PATENT AND TRADEMARK OFFICE
CERTIFICATE OF CORRECTION

PATENT NO.   : 6,543,609 B2
DATED        : April 8, 2003
INVENTOR(S)  : James L. Layne et al.

It is certified that error appears in the above-identified patent and that said Letters Patent is hereby corrected as shown below:

Column 5,
Line 48, delete the hyphen before "either".

Column 8,
Line 4, please replace "resent" with -- present --.

Column 10,
Line 38, change "with out the" to -- without moving the --

Signed and Sealed this

Nineteenth Day of August, 2003

JAMES E. ROGAN
*Director of the United States Patent and Trademark Office*